(12) United States Patent
Zeng et al.

(10) Patent No.: US 7,620,013 B2
(45) Date of Patent: Nov. 17, 2009

(54) METHOD AND SYSTEM FOR DECODING CONTROL CHANNELS USING REPETITION REDUNDANCY

(75) Inventors: Huaiyu (Hanks) Zeng, Red Bank, NJ (US); Nelson Sollenberger, Farmingdale, NJ (US); Arie Heiman, Rannana (IL)

(73) Assignee: Broadcom Corporation, Irvine, CA (US)

( * ) Notice: Subject to any disclaimer, the term of this patent is extended or adjusted under 35 U.S.C. 154(b) by 463 days.

(21) Appl. No.: 11/325,997

(22) Filed: Jan. 5, 2006

(65) Prior Publication Data
US 2007/0153785 A1    Jul. 5, 2007

Related U.S. Application Data

(60) Provisional application No. 60/752,751, filed on Dec. 21, 2005.

(51) Int. Cl.
*H04M 7/00*    (2006.01)
(52) U.S. Cl. .................. 370/329; 370/332; 370/343
(58) Field of Classification Search ............. 370/329, 370/332, 343
See application file for complete search history.

(56) References Cited

U.S. PATENT DOCUMENTS 5,936,979 A * 8/1999 Jyrkka .................. 714/763
2006/0221880 A1 * 10/2006 Riddington et al. ......... 370/310

OTHER PUBLICATIONS

Austin, Mark, Ph.D., SAIC and Synchronized Networks for Increased GSM Capacity, Sep. 2003, pp. 1-26.

* cited by examiner

*Primary Examiner*—Patrick N. Edouard
*Assistant Examiner*—Eric Elcenko
(74) *Attorney, Agent, or Firm*—McAndrews, Held & Malloy, Ltd.

(57) ABSTRACT

Methods and systems for decoding control channels using repetition redundancy may include generating enhanced soft bits by combining soft bits generated from the two GSM SACCH blocks. Combining may comprise averaging soft bits in one GSM SACCH block and corresponding soft bits from the other GSM SACCH block. Information in one GSM SACCH block may be repeated in the other GSM SACCH block. If repetition is detected, the enhanced soft bits may comprise enhanced soft bits for at least a portion of level 1 region and level 3 region of the GSM SACCH block. Otherwise, the generated enhanced soft bits may comprise enhanced soft bits for at least a portion of level 3 region of the GSM SACCH block.

16 Claims, 14 Drawing Sheets

METHOD AND SYSTEM FOR DECODING CONTROL CHANNELS USING REPETITION REDUNDANCY

CROSS-REFERENCE TO RELATED APPLICATIONS/INCORPORATION BY REFERENCE

This application makes reference to, claims priority to, and claims benefit of U.S. Provisional Application Ser. No. 60/752,751 filed Dec. 21, 2005;

This application makes reference to:

U.S. application Ser. No. 11/325,721 filed on Jan. 5, 2006;

U.S. application Ser. No. 11/325,751 filed on Jan. 5, 2006;

U.S. application Ser. No. 11/325,808 filed on Jan. 5, 2006;

U.S. application Ser. No. 11/325,752 filed on Jan. 5, 2006;

U.S. application Ser. No. 11/325,756 filed on Jan. 5, 5006;

U.S. application Ser. No. 11/325,759 filed on Jan. 5, 2006;

U.S. application Ser. No. 11/150,926, filed on Jun. 13, 2005;

U.S. application Ser. No. 11/271,692, filed on Nov. 10, 2005;

U.S. application Ser. No. 11/150,931, filed on Jun. 13, 2005;

U.S. application Ser. No. 11/150,957, filed on Jun. 13, 2005;

U.S. application Ser. No. 11/151,030, filed on Jun. 13, 2005;

U.S. application Ser. No. 11/151,029, filed on Jun. 13, 2005;

U.S. application Ser. No. 11/189,509, filed on Jul. 26, 2005; and

U.S. application Ser. No. 11/189,634, filed on Jul. 26, 2005.

Each of the above stated applications is hereby incorporated herein by reference in its entirety.

FIELD OF THE INVENTION

Certain embodiments of the invention relate to cellular wireless communication systems. More specifically, certain embodiments of the invention relate to a method and system for decoding control channels using repetition redundancy.

BACKGROUND OF THE INVENTION

Cellular communication systems provide wireless communication services in many populated areas of the world. While cellular communication systems were initially constructed to service voice communications, they are now called upon to support data communications as well. The demand for data communication services has exploded with the acceptance and widespread use of the Internet. While data communications have historically been serviced via wired connections, cellular users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created or modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell or set of sectors. The base stations may be coupled to base station controllers (BSCs), with each BSC serving a plurality of base stations. Each BSC couples to a mobile switching center (MSC). Each BSC also typically directly or indirectly couples to the Internet.

In operation, each base station (BS) communicates with a plurality of wireless terminals operating in its cell/sectors. A BSC coupled to the base station routes voice communications between the MSC and the serving base station. The MSC routes the voice communication to another MSC or to the PSTN, for example. The BSCs route data communications between a servicing base station and a packet data network that may include or couple to the Internet. Transmissions from base stations to wireless terminals are referred to as "forward link or downlink" transmissions while transmissions from wireless terminals to base stations are referred to as "reverse link or uplink" transmissions.

Wireless links between base stations and their serviced wireless terminals typically operate according to one or more of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application.

After a wireless link is established between a base station (BS) and a wireless terminal or a mobile station (MS), the base station may communicate control information and/or system information to the mobile station. The control information and/or system information may be encoded by the base station prior to being transmitted to the mobile station. The mobile station may decode and utilize the control information and/or system information during operation of the established wireless link. However, prior techniques for decoding utilized by the mobile station may not fully recover the original control information and/or system information that was encoded and communicated by the base station. Furthermore, poor reception of control channel becomes a bottleneck for advanced receiver in which data/voice channel receiving performance has been substantially improved.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for decoding control channels using repetition redundancy, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for decoding control channels using repetition redundancy. Aspects of the method may comprise generating enhanced soft bits for a GSM slow associated control channel (SACCH) block by combining soft bits generated for the GSM SACCH block with corresponding soft bits generated for another GSM SACCH block. The soft bits may be combined by averaging the two corresponding soft bits from the two GSM SACCH blocks. The GSM SACCH block may be subsequent to the other (another) GSM SACCH block.

If the repetition of information in the GSM SAACH block is detected in the other GSM SACCH block, the enhanced soft bits may comprise enhanced soft bits for at least a portion of level 1 region of the GSM SACCH block and for at least a portion of level 3 region of the GSM SACCH block. If the repetition of information in the GSM SAACH block is not detected in the other GSM SACCH block, the generated enhanced soft bits may comprise enhanced soft bits for at least a portion of level 3 region of the GSM SACCH block.

In one embodiment of the invention, the detecting of the repetition of information may be performed by calculating a cross-correlation between the soft bits for one GSM SACCH block and the soft bits for the other GSM SACCH block. In another embodiment of the invention, the detecting may be performed by comparing hard bits for the GSM SACCH block with the hard bits for the other (another) SACCH block. The hard bits may be generated from the soft bits that were generated for the GSM SACCH block. Repetition may be detected by determining whether a number of the hard bits for the GSM SACCH block have the same logic value as corresponding generated hard bits for the other GSM SACCH block is above a threshold. Repetition may also be detected by comparing the hard bits for one GSM SACCH block to the hard bits for the other GSM SACCH block in a plurality of regions of the GSM SACCH block. The thresholds for each of the plurality of regions may be different. For example, the plurality of regions may comprise the level 1 region and the level 3 region of the GSM SACCH block.

Figure 1A:
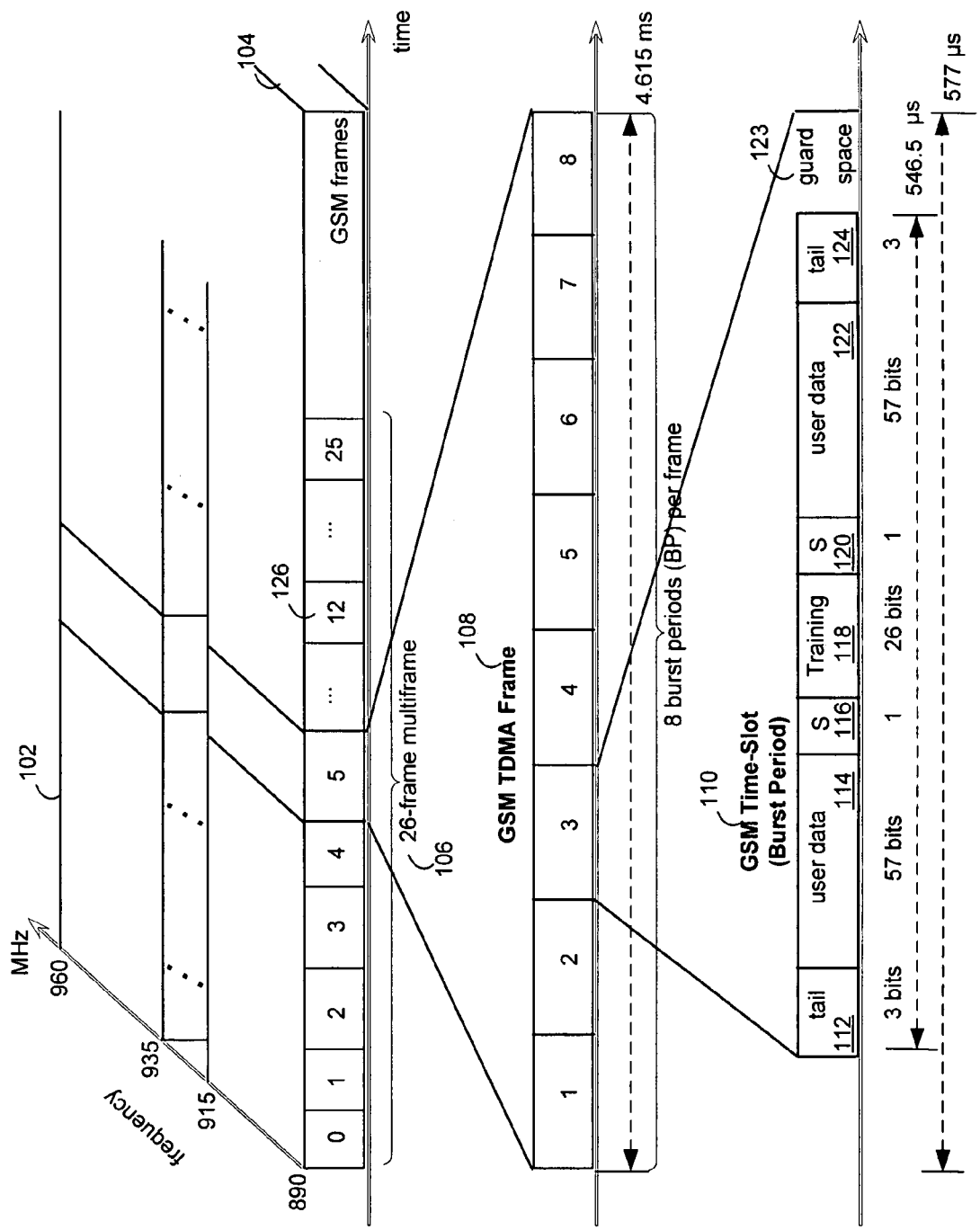
FIG. 1A is a graph illustrating an exemplary GSM frame and a burst period, which may be used in accordance with an embodiment of the invention.

FIG. 1A is a graph illustrating an exemplary GSM frame and a burst period, which may be used in connection with an embodiment of the invention. GSM utilizes a combination of Time and Frequency Division Multiple Access (TDMA/FDMA). Referring to FIG. 1A, there is shown a downlink frequency band 102, an uplink frequency band 104, a GSM TDMA frame 108 and a GSM timeslot or burst period 110. The GSM downlink frequency band 102 comprises a range of 935-960 MHz and the GSM uplink frequency band comprises a range of 104 is 890-915 MHz. The FDMA aspect of GSM involves the division of frequency of the 25 MHz bandwidth for the uplink frequency band 104 and the downlink frequency band 102 into 124 carrier frequencies, each of which comprises a bandwidth of 200 kHz. One or more carrier frequencies may be assigned per base station. The TDMA aspect of GSM involves the division in time of each carrier frequency into 8 time-slots, or burst periods (BPs), such as BP 110. One time-slot may be used for transmission by a mobile station and one time-slot may be used for reception.

The GSM timeslot or BP 110 may comprise tail portions 112 and 124, user data portions 114 and 122 stealing bits 116 and 120, a training sequence 118, and guard space 123. The tail portions 112 and 124 may each comprise 3 bits. The user data portions 114 and 122 may each comprise 57 bits, for example, and may be used for data transmission. The stealing bits 116 and 120 may each comprise 1 bit and may be used by fast associated control channel (FACCH) messages. The training sequence 118 may comprise 26 bits, for example, and may be utilized by a mobile station receiver to synchronize and compensate for time dispersion produced by multipath propagation. The guard space 123 may comprise 8.25 bits, for example, and may allow for propagation time delay in the arrival of bursts. The burst period 110 may be transmitted in 0.577 milliseconds.

Each group of 8 time-slots or burst periods, such as the burst period 110, may form a GSM TDMA frame 108. The GSM frame 108 may be transmitted every 4.615 ms. GSM frames, such as the GSM frame 108, may be further grouped into multiframes. A GSM multiframe may comprise 26 TDMA frames or 51 TDMA frames. For example, the GSM multiframe 106 may comprise 26 TDMA frames, numbered 0, 1, . . . , 25. The 26-frame multiframe 106 may comprise 24 traffic channels (TCH), which may be communicated in frames 0, 1, . . . , 11 and frames 13, 14, . . . , 24. The $13^{th}$ frame 126 may be used for communicating a slow associated control channel (SACCH) block. The last $25^{th}$ frame is currently not used in GSM-based systems.

Figure 1B:
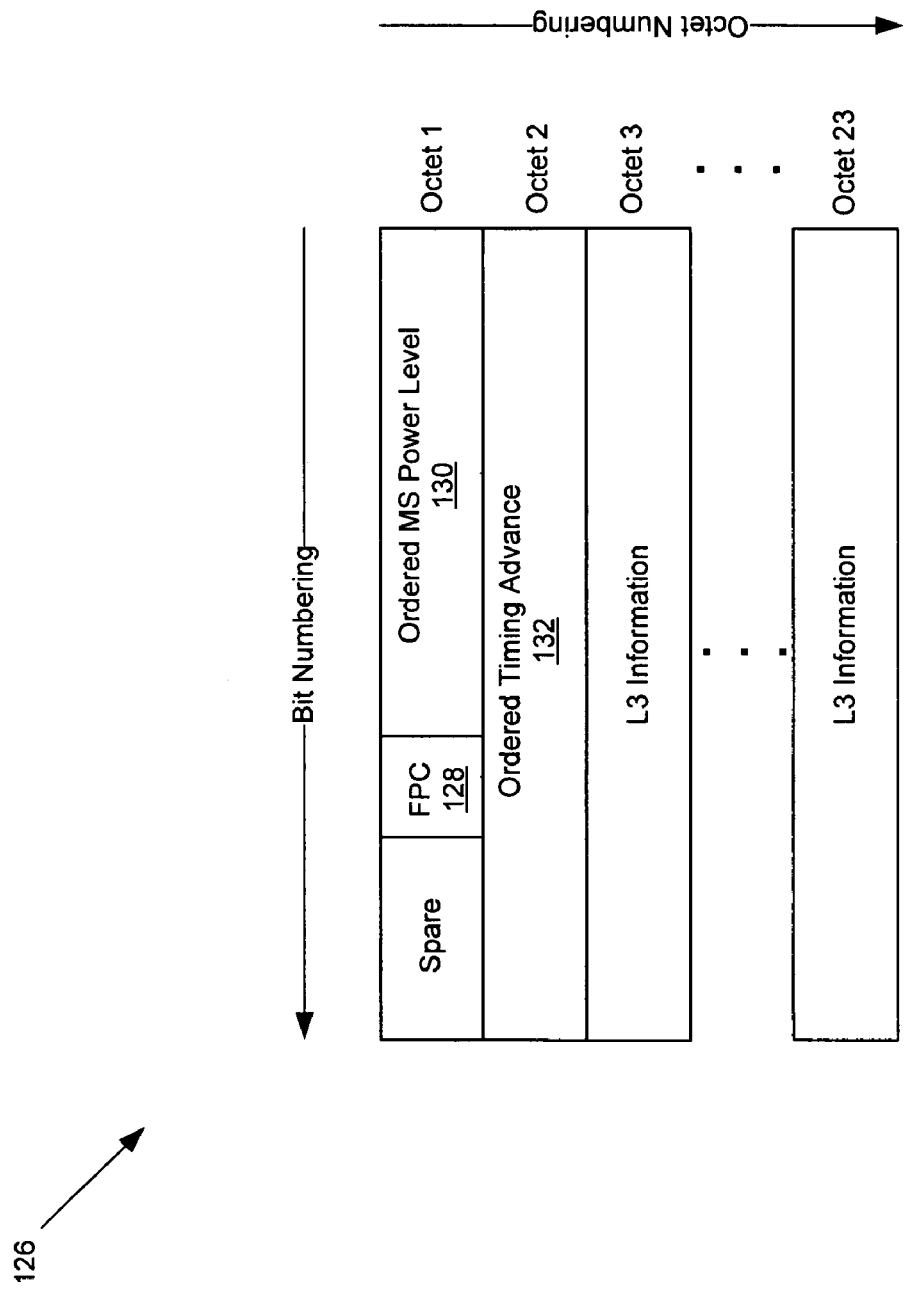
FIG. 1B is a block diagram of an exemplary slow associated control channel (SACCH) block, which may be used in accordance with an embodiment of the invention.

FIG. 1B is a block diagram of an exemplary slow associated control channel (SACCH) block, which may be used in accordance with an embodiment of the invention. Referring to FIG. 1B, the SACCH block 126 may comprise 23 octets for a total of 184 bits. Octets 1 and 2 may comprise control information in level 1 (L1) region and octets 3, 4, . . . , 23 may comprise system information in level 3 (L3) region. The L1 region control information may comprise fast power control (FPC) bit information 128, ordered mobile station power level 130, and ordered timing advance 132. The spare bits within the SACCH block 126 may be encoded with the binary value 0, for example.

The FPC bit 128 may have a different interpretation depending on the channel mode of the channel to which the SACCH 126 is associated. For example, if the channel mode for a wireless connection is such that FPC may be used, the FPC bit 128 may indicate whether Fast Measurement Reporting and Power Control mechanism may be used. The FPC bit 128 may be coded as 0 when fast power control is not used, and 1 when fast power control is in use.

The ordered mobile station (MS) power level 130 may be used by a base station, for example, to indicate a desired transmission power level to an associated mobile station. The ordered timing advance information 132 may be communicated from a base station (BS) to an associated MS and may be used by the MS to advance its timings of transmissions to the BS so as to compensate for propagation delay.

During wireless communication of data between a BS and a MS, L3 region system information in octets 3, . . . , 23 may stay unchanged. In instances when the MS is in handover or when receiving short messages, for example, L3 region system information in the SACCH block 126 may change. In this regard, a continuous transmission of SACCH blocks in both uplink and downlink paths may be essential to proper exchange of data for an established wireless connection or for a wireless connection in handover. For example, an uplink path may be used by a MS to communicate measurement result messages to the BS via the SACCH 126. Similarly, a downlink path may be used by the BS to communicate system information and measurement requests to the MS via the SACCH 126.

Figure 2A:
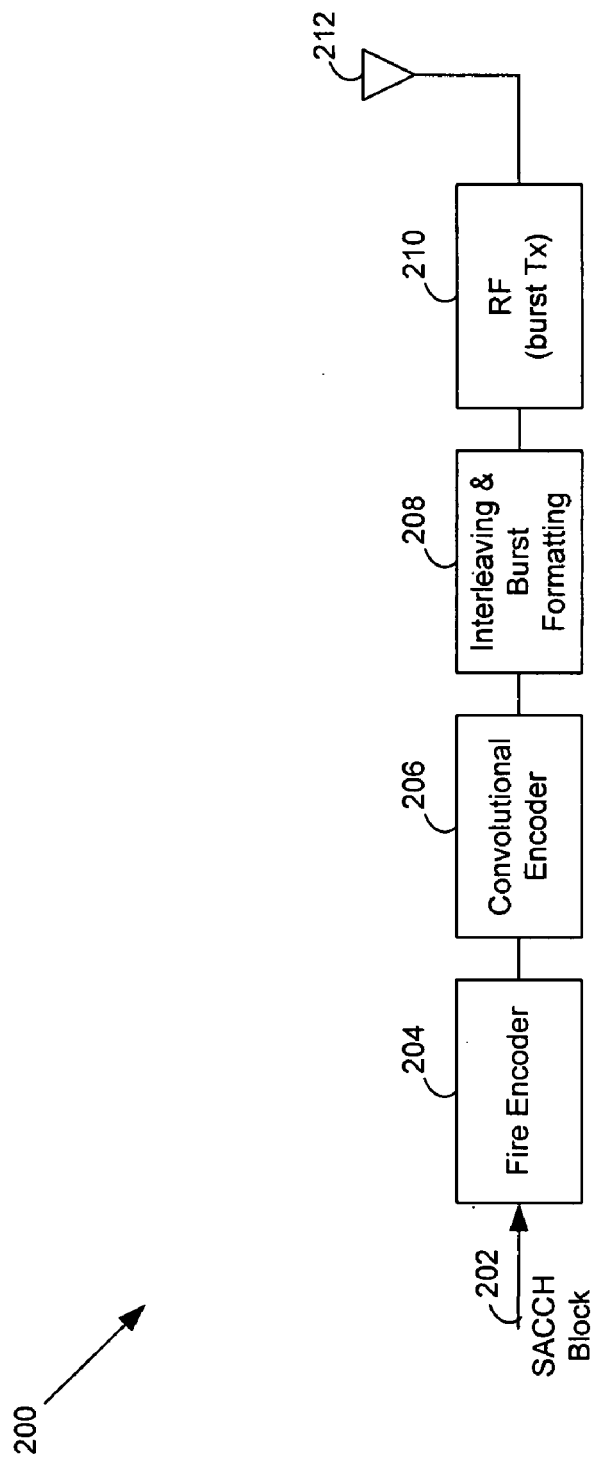
FIG. 2A is a block diagram of an exemplary base station (BS) for encoding and transmission of information, which may be utilized in connection with an embodiment of the invention.

FIG. 2A is a block diagram of an exemplary base station (BS) for encoding and transmission of information, which may be utilized in connection with an embodiment of the invention. Referring to FIG. 2A, the base station 200 may comprise a Fire code encoder 204, a convolutional encoder 206, an interleaving and burst formatting block (IBFB) 208, a radio frequency block (RFB) 210, and an antenna 212.

The Fire code encoder 204 may comprise suitable circuitry, logic, and/or code and may enable block coding of received bit sequence, such as the SACCH block 202. The Fire code encoder 204 may append the received 184 bits of the received SACCH block 202 with 40 parity bits. The 40 parity bits may be calculated by the encoder 204 based on the SACCH block 202 and may be used by a receiver during error correction. Furthermore, the 40 parity bits may be used for correction of a burst of errors, such as 11 errors within a single portion of transmitted data.

The convolutional encoder 206 may comprise suitable circuitry, logic, and/or code and may enable one-half rate encoding of Fire code encoded data. The convolutional encoder 206 may utilize multiplication by a finite-field polynomial and may generate 2 encoded bits for each input bit. In this regard, the number of bits at the output of the convolutional encoder 206 is double the number of input bits at the input of the encoder 206.

The IBFB 208 may comprise suitable circuitry, logic, and/or code and may enable interleaving of encoded bits so that sequential coded bits are not next to each other during transmission. In this regard, interleaving may be used for randomizing errors in a transmit channel. The IFBF 208 may also enable burst formatting or adding framing bits to the interleaved encoded bitstream, resulting in burst formation. Burst formatting may comprise, for example, adding a training sequence to the interleaved and encoded bitstream.

The RFB 210 may comprise suitable circuitry, logic, and/or code and may enable further processing, such as modulation, signal amplification and filtering of the interleaved and burst-formatted signal received form the IBFB 208. The resulting RF signal may be transmitted via the antenna 212.

Figure 2B:
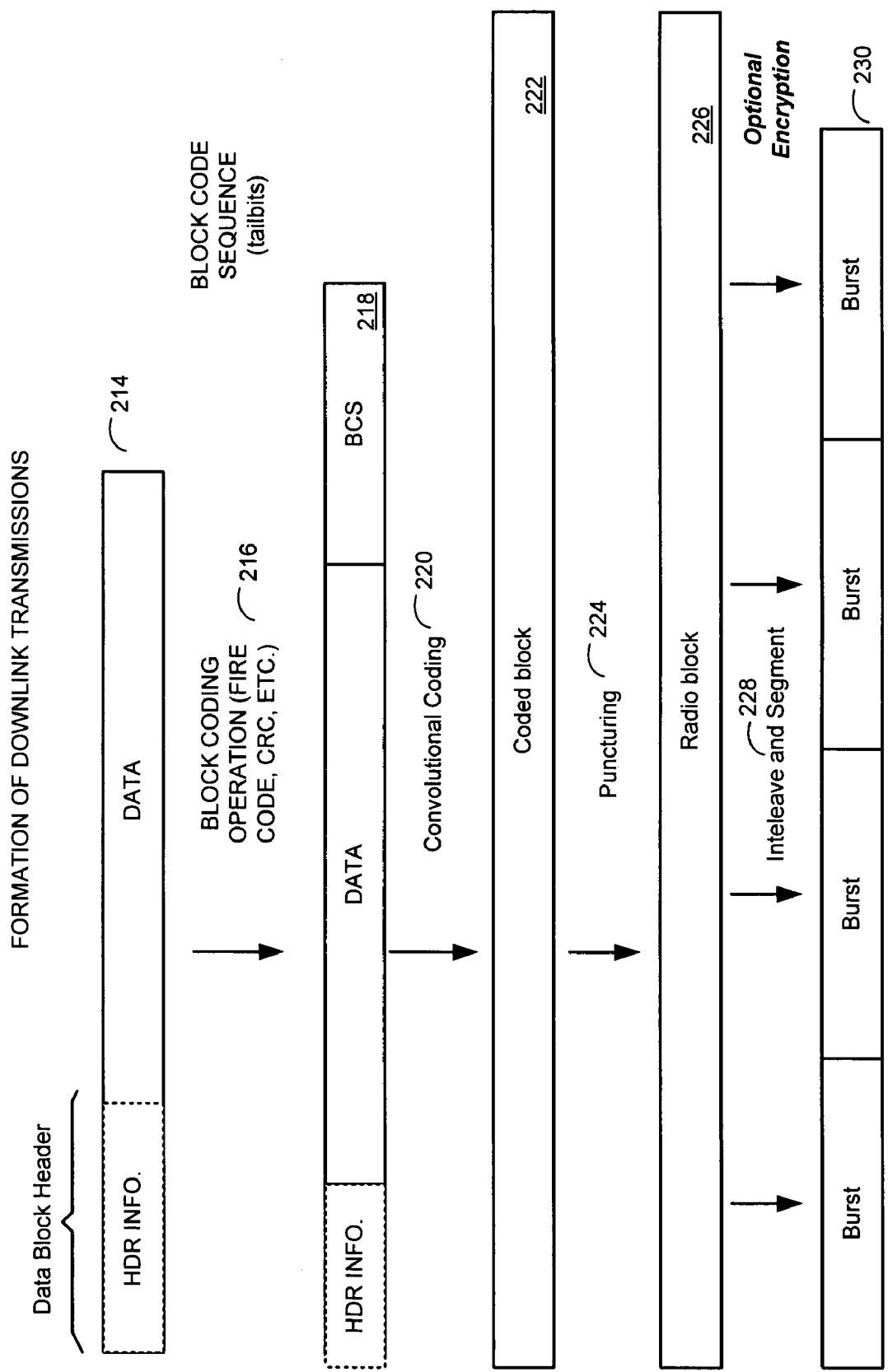
FIG. 2B is a block diagram illustrating formation of an exemplary downlink transmission, which may be utilized in connection with an embodiment of the invention.

FIG. 2B is a block diagram illustrating formation of an exemplary downlink transmission, which may be utilized in connection with an embodiment of the invention. Referring to FIGS. 2A and 2B, data 214, such as the 168-bits of L3 region information within the SACCH block 202, may be initially uncoded and maybe accompanied by a data block header, such as the 16-bits of L1 region information within the SACCH block 202. Block coding operations 216 may then be performed on the data block 214 resulting in a block coding sequence (BCS) 218, which is appended to the data 214. The block coding operation 216 may be used for error detection/correction for the data block 214 and may comprise a cyclic redundancy check (CRC) or a Fire code operation.

Fire codes allow for either error correction or error detection. Fire codes are a shortened binary cyclic code that appends redundancy bits to bits of the data Header and Data. After block coding has supplemented the data 214 with redundancy bits for error detection, convolutional coding 220 may be performed by the convolutional encoder 206 for calculation of additional redundancy for error correction to correct the transmissions caused by the radio channels. The convolutional encoding operation 220 may result in a coded data block 222. Some redundant bits generated by the convolutional encoder 206 may be removed prior to transmission via the puncturing operation 224 to generate a radio block 226. In this regard, puncturing may increase the rate of the convolutional code and may reduce the redundancy per data block transmitted. In addition, puncturing may lower the bandwidth requirements such that the convolutional encoded signal may fit into the available channel bit stream. The convolutional encoded punctured bits of the radio block 226 may be communicated to the IBFB 208, which may shuffle various bit streams and segments of the interleaved bit streams into the 4 bursts 230. The bursts 430 may be further modulated and converted to RF by the RFB 210. The RF bursts may be transmitted via the antenna 212.

Figure 3A:
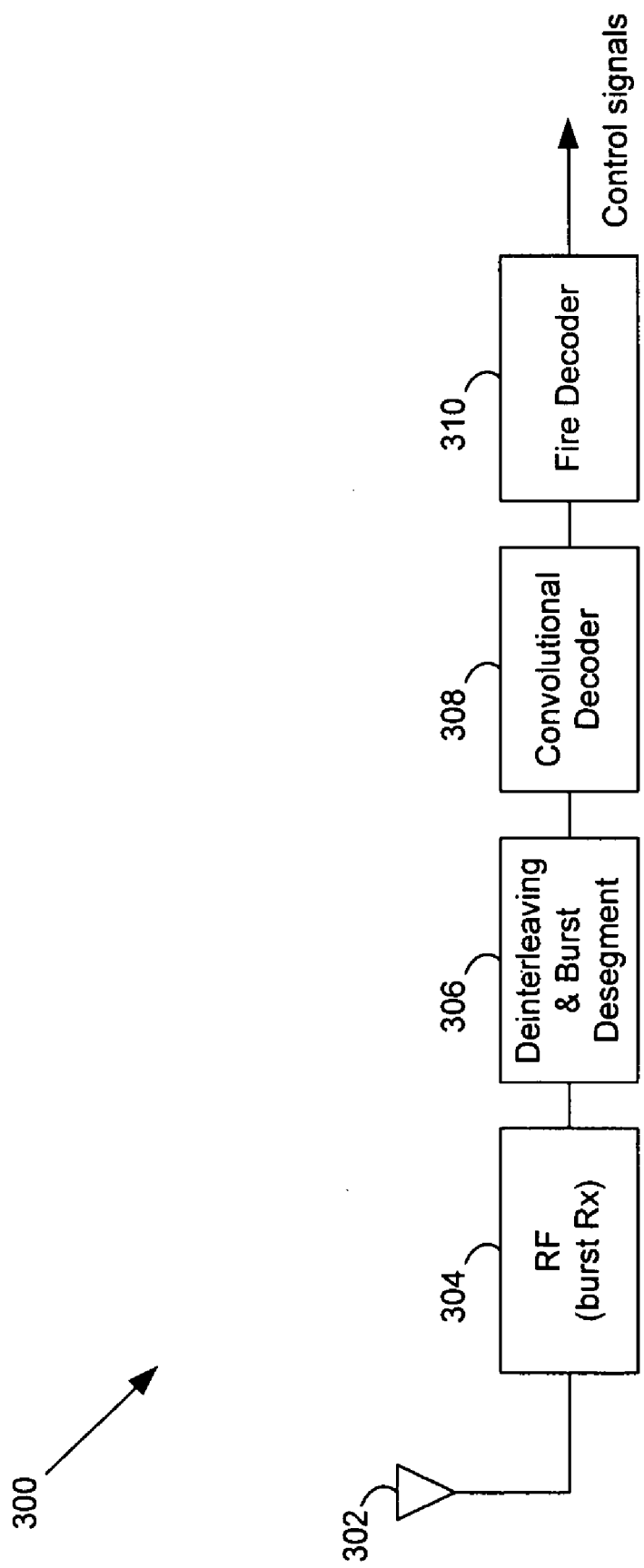
FIG. 3A is a block diagram of an exemplary mobile station (MS) for recovery of received data, in accordance with an embodiment of the invention.

FIG. 3A is a block diagram of an exemplary mobile station (MS) for recovery of received data, in accordance with an embodiment of the invention. Referring to FIG. 3A, a mobile station 300 may comprise a radio frequency block (RFB) 304, an antenna 302, a deinterleaver and burst desegmentation block (DBDB) 306, a convolutional decoder 308, and a Fire code decoder 310.

The RFB 304 may comprise suitable circuitry, logic, and/or code and may enable processing of RF bursts received via the antenna 302. For example, the RFB 304 may enable downconversion, signal amplification and filtering of the received RF bursts to generate interleaved and burst-formatted encoded bitstream data.

The DBDB 306 may comprise suitable circuitry, logic, and/or code and may enable deinterleaving of interleaved bitstream data. The DBDB 306 may also enable burst desegmentation by removing framing bits from the received bitstream data.

The convolutional decoder 308 may comprise suitable circuitry, logic, and/or code and may enable one-half rate decoding of the deinterleaved and desegmented data received from the DBDB 306. The convolutional decoder 308 may utilize, for example, Viterbi decoding or modified Viterbi decoding to provide error correction, and may generate, for example, 1 decoded bit for each 2 input encoded bits. The decoded data may be communicated to the Fire code decoder 310. The Fire code decoder 310 may comprise suitable circuitry, logic, and/or code and may enable decoding of a bit sequence received from the convolutional decoder 308. The Fire code decoder 310 may extract 40 parity bits from the received bit sequence to generate 184-bit decoded data. The decoded data may be, for example, a SACCH block. The extracted 40 parity bits may be used by the Fire code decoder 310 to perform a CRC check for error detection within the SACCH block.

Figure 3B:
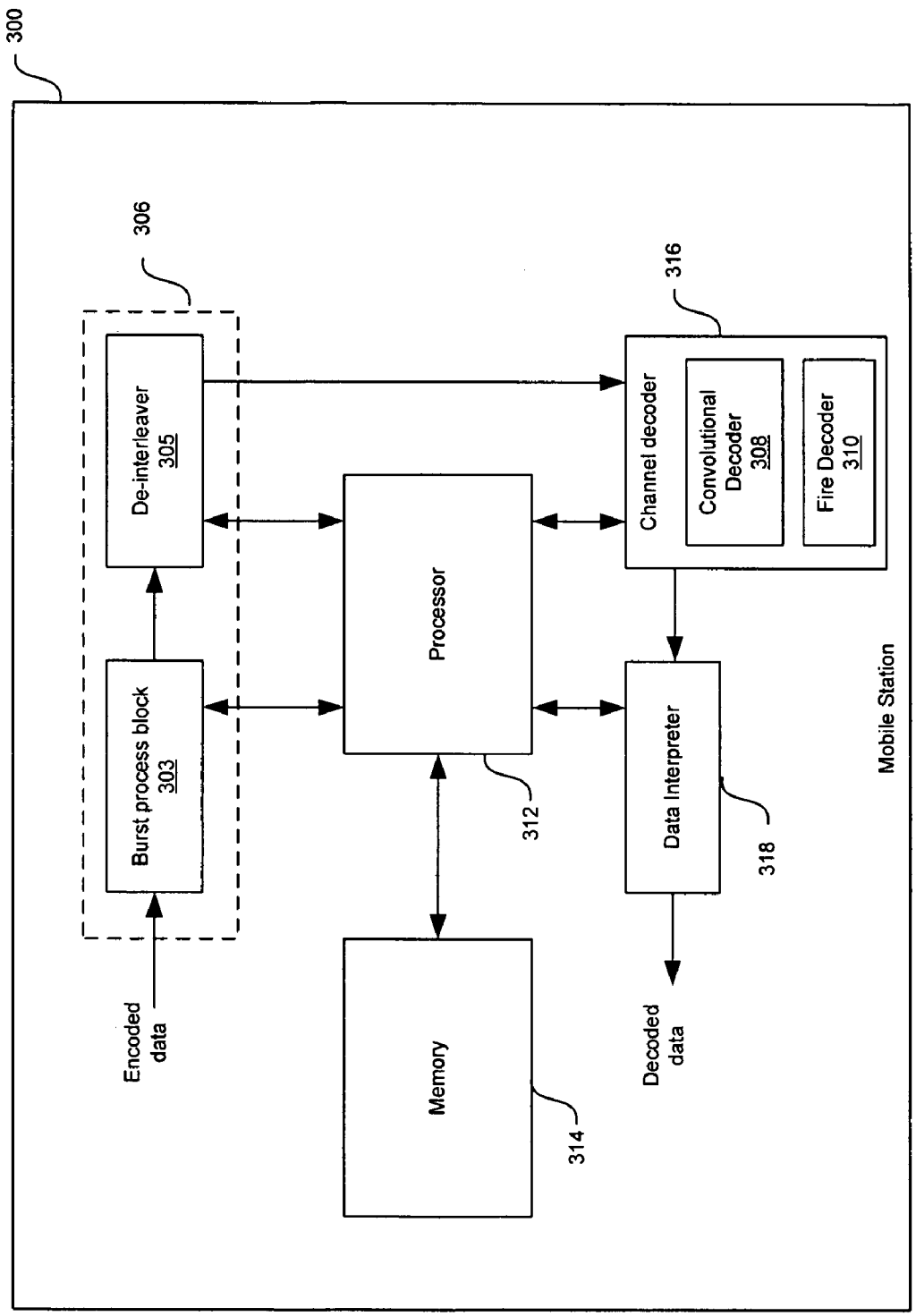
FIG. 3B is a block diagram illustrating a mobile station (MS) with a processor and memory for decoding received data, in accordance with an embodiment of the invention.

FIG. 3B is a block diagram illustrating a mobile station (MS) with a processor and memory for decoding received data, in accordance with an embodiment of the invention. Referring to FIG. 3B, there is shown the mobile station 300 that may comprise the DBDB 306, a channel decoder 316, a processor 312, a memory 314, and a data interpreter 318. The DBDB 306 may comprise a burst process block 303 and a de-interleaver 305. The channel decoder 316 that may comprise the convolutional decoder 308 and the Fire code decoder 310.

The mobile station 300 may be enabled to perform single antenna interference cancellation (SAIC) algorithms and/or redundancy-based decoding algorithms. The U.S. application Ser. No. 11/150,926 filed on Jun. 13, 2005, discloses SAIC in more detail, and is hereby incorporated herein by reference in its entirety. U.S. application Ser. No. 11/325,721 filed on even date herewith, discloses redundancy-based decoding algorithms, and is hereby incorporated herein by reference in its entirety.

The burst process block 303 may comprise suitable logic, circuitry, and/or code that may enable performing the burst process portion of the decoding operation of the mobile station 300. The burst process block 303 may execute, for example, channel estimation and channel equalization on signals received from the RFB 304. Results from the channel estimation may be utilized for channel equalization to generate a plurality of data bursts based on a maximum-likelihood sequence estimation (MLSE) operation. U.S. application Ser. No. 11/325,808, filed on even date herewith, discloses burst processing, and is hereby incorporated herein by reference in its entirety. The output of the burst process block 303 may be transferred to the de-interleaver 305.

The de-interleaver 305 may comprise suitable logic, circuitry, and/or code that may enable multiplexing of bits from a plurality of data bursts received from the burst process block 303 to form the frame inputs to the channel decoder 316. Interleaving may be utilized to reduce the effect of channel fading distortion, for example.

The data interpreter 318 may comprise suitable logic, circuitry, and/or code that may enable performing content specific processing operations on the results of the channel decoder 316 for specified applications.

The processor 312 may comprise suitable logic, circuitry, and/or code that may enable performing computations and/or management operations. The processor 312 may also be enabled to communicate and/or control at least a portion of the operations of the burst process block 303, the de-interleaver 305, the channel decoder 316, and the data interpreter 318. The memory 314 may comprise suitable logic, circuitry, and/or code that may enable storage of data and/or control information. The memory 314 may be enabled to store information that may be utilized and/or that may be generated by the burst process block 102, the de-interleaver 104, the channel decoder 108 and the media decoder 110. In this regard, information may be transferred to and from the memory 314 via the processor 312, for example.

Figure 3C:
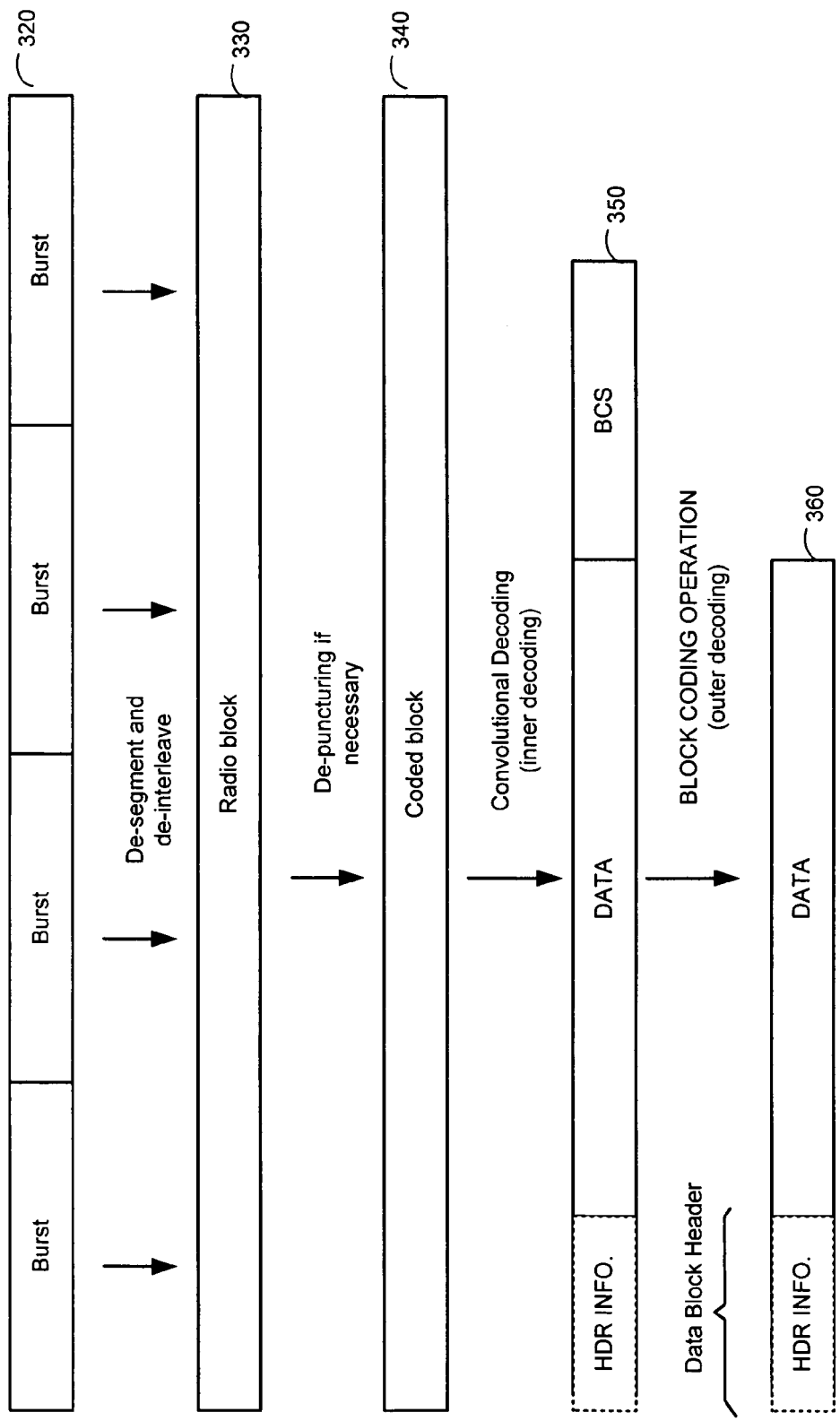
FIG. 3C is a block diagram illustrating recovery of data within a mobile station (MS), in accordance with an embodiment of the invention.

FIG. 3C is a block diagram illustrating recovery of data within a mobile station (MS), in accordance with an embodiment of the invention. Referring to FIGS. 3A and 3C, interleaved and segmented bursts 320 may be received by the DBDB 306. The DBDB 306 may de-segment and de-interleave the interleaved and segmented bursts 320 to generate an encoded radio block 330. The encoded radio block 330 may be communicated to the convolutional decoder 308. A de-puncturing operation may be performed on the encoded radio block 330 by the convolutional decoder 308 to generate a coded block 340. De-puncturing may comprise adding in redundant bits that may have been removed by puncturing prior to transmission.

The convolutional decoder 308 may decode the coded block 340 to generate the header, data, and block coding sequence (BCS) 350. The generated header, data, and BCS 350 may be communicated to the Fire code decoder 310. The Fire code decoder 310 may apply a block decoding operation, also referred to as an outer decoding operation, to extract the BCS and generate header information and data 360. The Fire code decoder 310 may be used to correct a few bits in the generated header, data, and BCS 350 that may be in error. However, when the number of erroneous bits is too large, it may not be possible to correct the erroneous bits using the Fire code. In instances where the Fire code decoder may indicate an uncorrectable condition, the data comprising the erroneous bits may not be utilized.

Figure 4A:
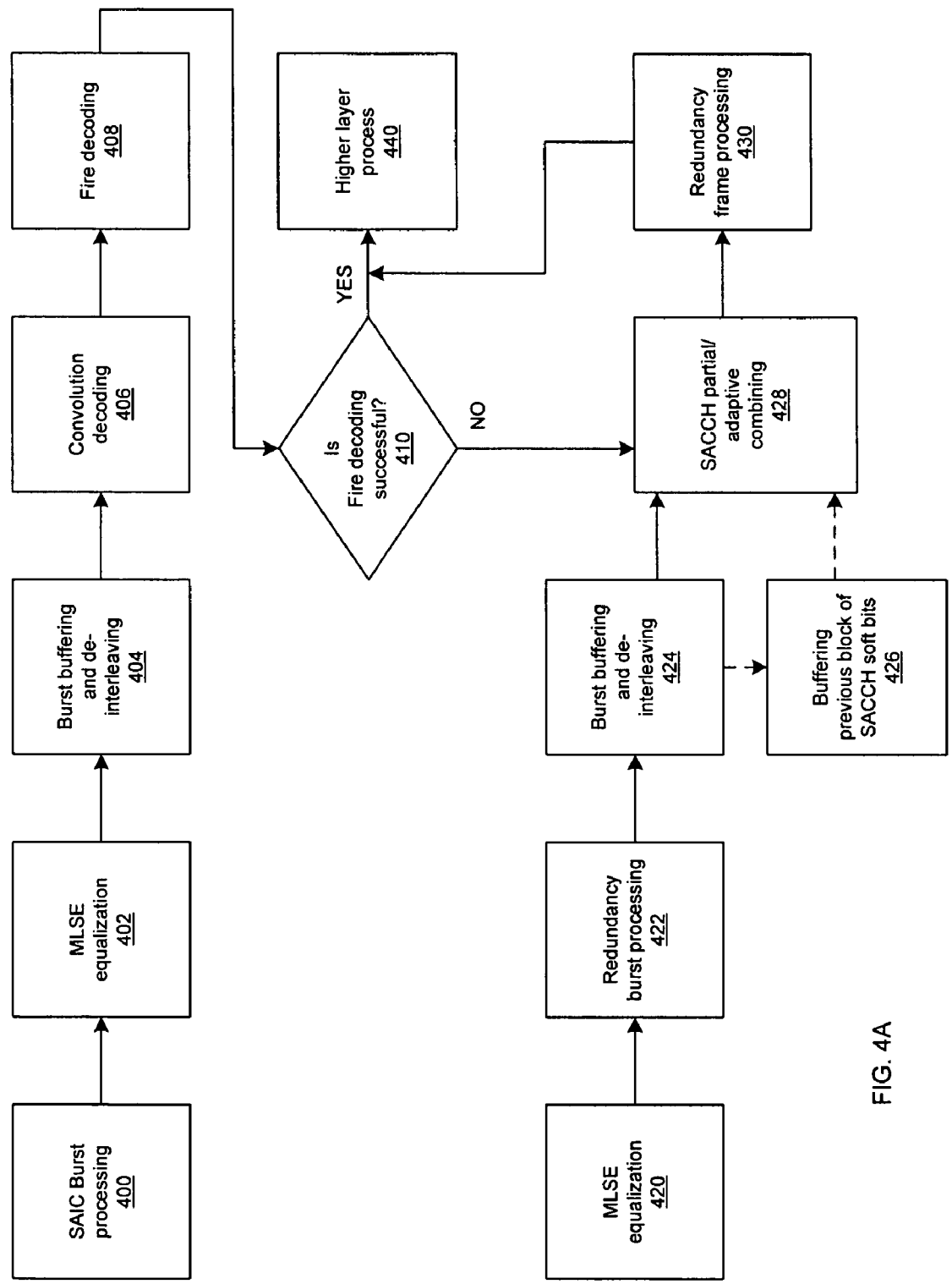
FIG. 4A is a flow diagram illustrating exemplary steps in decoding received data, in accordance with an embodiment of the invention.

FIG. 4A is a flow diagram illustrating exemplary steps in decoding received data, in accordance with an embodiment of the invention. Referring to FIG. 4A, the received signal bursts, which may be demodulated, digitized and processed in parallel in steps 400 and 420 by the radio frequency block (RFB) 304. The data to be decoded from the bursts may comprise SACCH blocks bearing control signals. The digital data processed by the steps 400 and 402 may comprise in-phase (I) and quadrature (Q) components of the received signal. Step 400 may comprise SAIC burst processing of the digitized signal. The burst processing may occur in, for example, the burst process block 303, which may execute, for example, channel estimation on signals received from the RFB 304.

In step 402, the results from the channel estimation may be utilized for channel equalization to generate a plurality of data bursts based on a maximum-likelihood sequence estimation (MLSE) equalization operation. In step 404, the bursts of data may be buffered, or stored. The bursts of data may be de-interleaved. For example, the base station 200 may have interleaved data before transmission in order to reduce the effect of channel fading distortion.

In step 406, the de-interleaved data from the step 404, which may be convolutional encoded, may be decoded. Convolutional decoding may utilize, for example, the Viterbi algorithm. In step 408, the convolutional decoded data may be further decoded using a Fire code decoding algorithm. The Fire code decoding algorithm may comprise utilizing additional bits for error detection and error correction. However, in instances where there are too many erroneous bits, the Fire code decoding algorithm may not be able to correct the erroneous bits. In such instances, the Fire code decoding algorithm may indicate that decoding was not successful.

In step 410, if the Fire code decoding was successful, the next step may be step 440. Otherwise, the next step may be step 428. In step 440, the decoded data may be communicated to higher layer processes for further processing.

In step 420, the digitized input data processed in step 400 may be MLSE equalized. In step 422, the equalized data may be processed using redundancy burst processing algorithm. In step 424, the equalized data bursts may be buffered and de-interleaved as in step 404. The equalized data may be soft bits because they may still be digitized representations of the received analog signals. Converting the digitized representations to logic ones and zeros may result in hard bits.

For example, the base station 200 may have modulated data such that a symbol represents one bit, and the transmitted symbols may have been attenuated and/or modified by interference signals. A receiver, for example, the mobile station 300, may digitally sample the received symbols to generate digital representation of the received symbols. Because of the attenuation and interference, the received symbols may not map cleanly to logic ones or logic zeros. Further processing may be necessary in order to determine whether the symbols should be set to logic one or logic zero. The symbols that are digitally represented may be referred to as the soft bits. The soft bits that have been determined to be logic ones or logic zeros may be referred to as the hard bits.

In step 426, the soft bits may be buffered for use in decoding a next SACCH block, if needed. In step 428, the soft bits may be enhanced by using partial combining methods and/or by using adaptive combining methods using soft bits from a previous SACCH block from step 426 and the current SACCH block from step 424. This is described in more detail with respect to FIGS. 5 and 6.

In step 430, the enhanced soft bits may be converted to hard bits. Redundancy frame processing, which may comprise convolutional decoding and Fire code decoding, may be utilized for the conversion. U.S. application Ser. No. 11/325, 751, filed on even date herewith, discloses frame processing using redundancy-based decoding algorithms, and is hereby incorporated herein by reference in its entirety. The next step may be step 440 described previously.

Figure 4B:
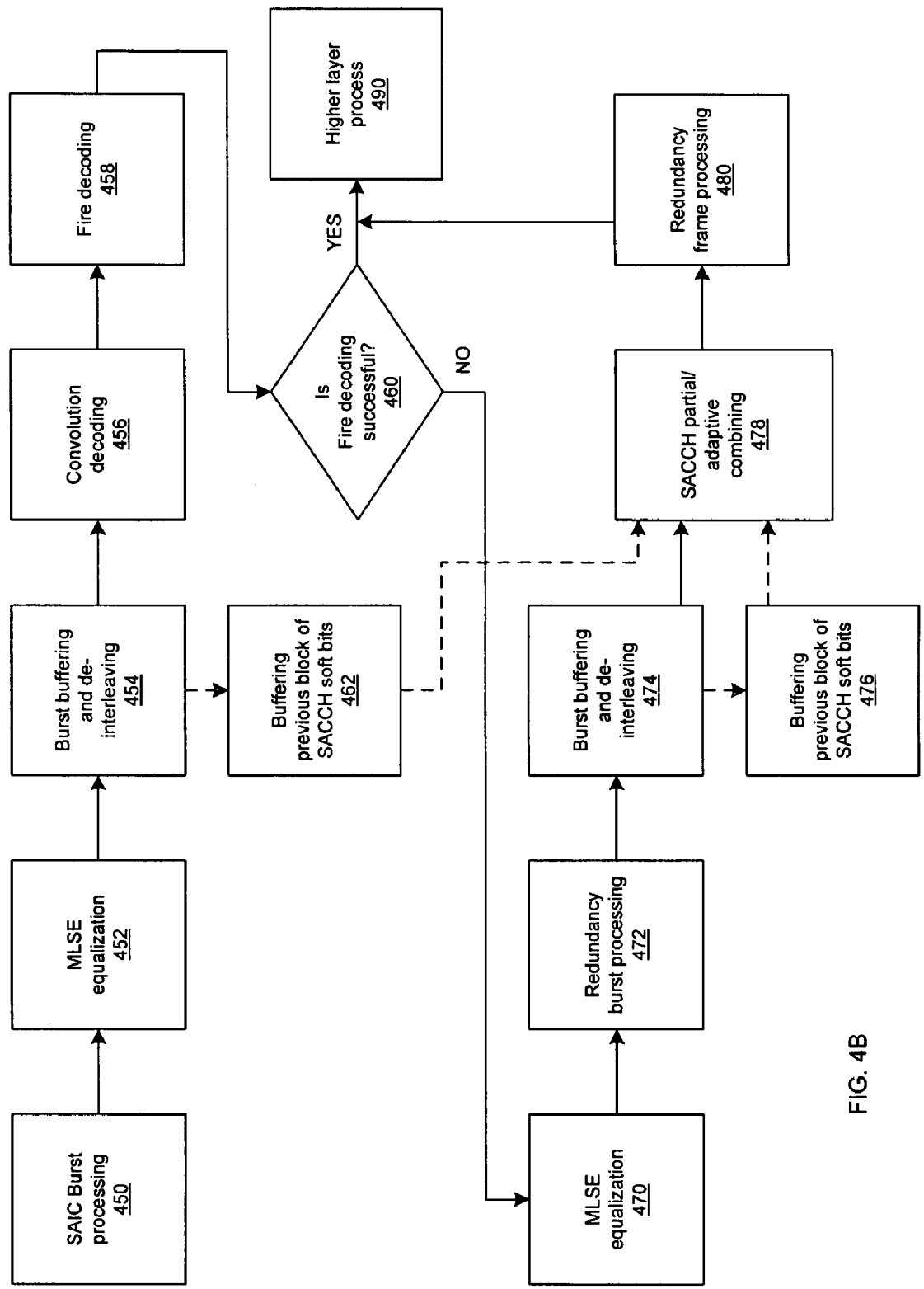
FIG. 4B is a flow diagram illustrating exemplary steps in decoding received data, in accordance with an embodiment of the invention.

FIG. 4B is a flow diagram illustrating exemplary steps in decoding received data, in accordance with an embodiment of the invention. This figure may comprise similar steps as FIG. 4A, however, this flow diagram describes serial steps in decoding data, as opposed to parallel steps for decoding data. Referring to FIG. 4B, step 450 may comprise SAIC burst processing of the digitized signal. In an exemplary embodiment of the invention, the burst processing may occur in the burst process block 303, which may execute channel estimation on signals received from the RFB 304.

In step 452, the results from the channel estimation may be utilized for channel equalization to generate a plurality of data bursts based on a maximum-likelihood sequence estimation (MLSE) equalization operation. In step 454, the bursts of data may be buffered, or stored. The bursts of data may be de-interleaved. For example, the base station 200 may have interleaved data before transmission in order to reduce the effect of channel fading distortion.

In step 456, the de-interleaved data from the step 454, which may be convolutional encoded, may be decoded. Convolutional decoding may utilize, for example, the Viterbi algorithm or a modified Viterbi algorithm. In step 458, the convolutional decoded data may be further decoded using a Fire code algorithm. The Fire code decoding algorithm may comprise utilizing additional bits for error detection and error correction. However, in instances where there are too many erroneous bits, the Fire code decoding algorithm may not be able to correct the erroneous bits. In such instances, the Fire code decoding algorithm may indicate that decoding was not successful.

In step 460, if the Fire code decoding was successful, the next step may be step 490. Otherwise, the next step may be step 470. In step 490, the decoded data may be communicated to higher layer processes for further processing.

In step 470, the digitized input data that may be processed in step 450 may be MLSE equalized. This step may not be reached if the Fire code decoding was successful. In step 472, the equalized data may be processed using redundancy burst processing algorithm. In step 474, the equalized data bursts may be buffered and de-interleaved as in step 454. The equalized data may be soft bits because they may still be digitized representations of the received analog signals. Converting the digitized representations to logic ones and zeros may result in hard bits.

In step 476, the soft bits may be buffered for use in decoding a next SACCH block, if needed. In step 478, the soft bits may be enhanced by using partial combining methods and/or adaptive combining methods using soft bits from a previous SACCH block from step 462 or from 476 and the current SACCH block from step 474. This is described in more detail with respect to FIGS. 5 and 6. In step 480, the enhanced soft bits may be converted to hard bits. Redundancy frame processing, which may comprise convolutional decoding and Fire code decoding, may be utilized for the conversion. The next step may be step 400.

Figure 5:
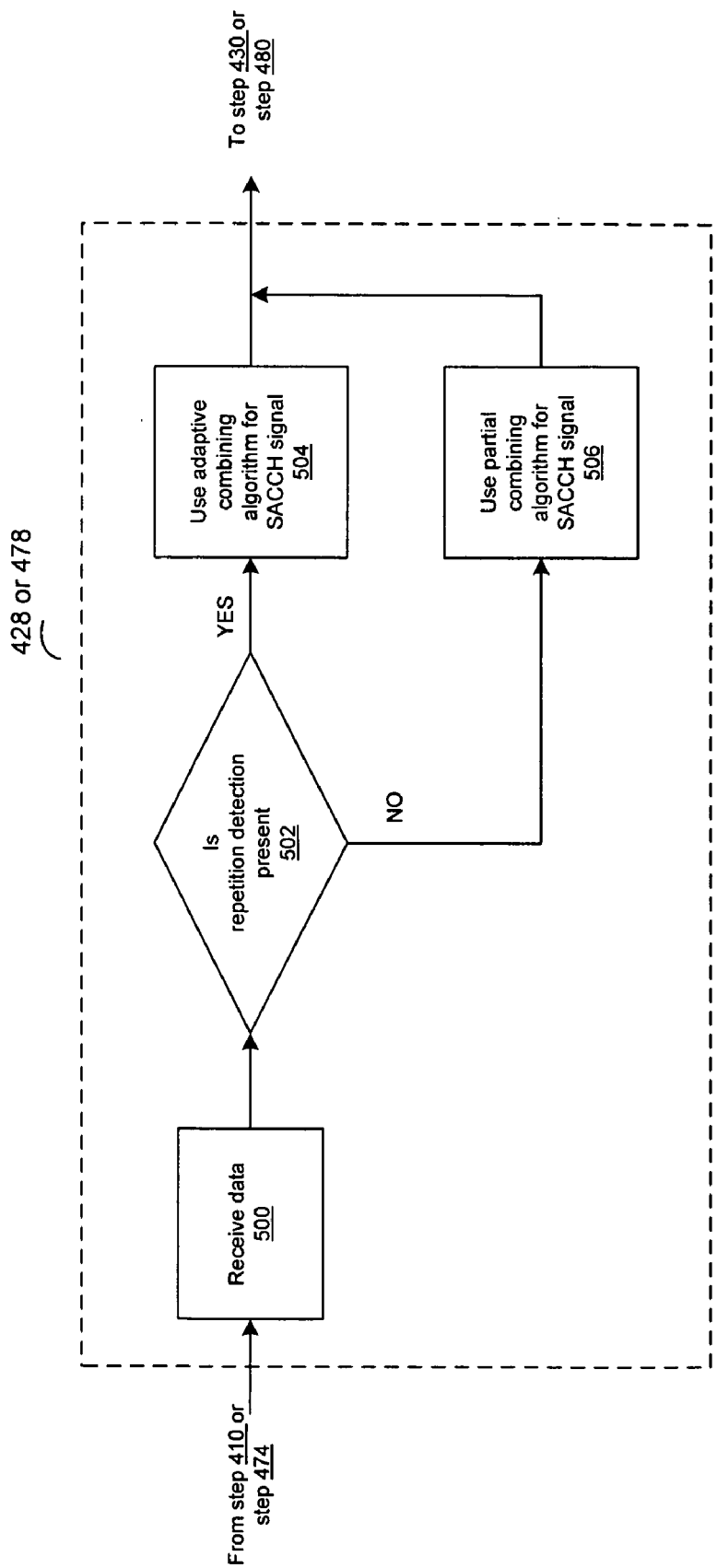
FIG. 5 is a flow diagram illustrating exemplary steps for combining received SACCH blocks, in accordance with an embodiment of the invention.

FIG. 5 is a flow diagram illustrating exemplary steps for combining received SACCH blocks, in accordance with an embodiment of the invention. This flow diagram may explain in more detail the process for enhancing soft bits in step 428 of FIG. 4A or step 478 of FIG. 4B. Referring to FIG. 5, in step 500, data from, for example, steps 424 and 426 in FIG. 4A or from steps 462, 474, and 476 in FIG. 4B may be processed. In step 502, if repetition detection is present, the next step may be step 504. Otherwise, the next step may be step 506. Repetition detection may be a process for detecting whether control information in a previous SACCH block may be repeated in the current SACCH block. The SACCH blocks need not be consecutive to each other. The various methods of repetition detection may be explained in more detail with respect to FIGS. 7A, 7B, and 7C.

If the parallel processing method of FIG. 4A is used, steps 504 and 506 may use data from the steps 424 and 426. Accordingly, the enhanced soft bits for the previous SACCH block generated by using the redundancy burst processing method and the soft bits for the current SACCH block may be used to generate the enhanced soft bits for the current SACCH block.

If the serial processing method of FIG. 4B is used, steps 504 and 506 may use data from the step 474 and data from step 462 or step 476. The step 462 may provide soft bits for the current SACCH block. The step 474 may provide soft bits for a previous SACCH block using the redundancy burst processing method, while the step 476 may provide soft bits for the previous SACCH block using the redundancy burst processing method. The soft bits from the step 462 may be combined with the soft bits from the step 474 if Fire code decoding was successful for a previous SACCH block. Otherwise, the soft bits from the step 476 may be combined with the soft bits from the step 474.

In step 504, an adaptive combining method may enhance soft bits for the current SACCH block by directly combining, for example, corresponding soft bits of the current SACCH block and the previous SACCH block. The bits combined may be the L1 region header and parity bits, and L3 region payload bits. Each soft bit in a previous SACCH block may be directly combined with the corresponding soft bit in the current SACCH block to take advantage of combining the gain of each soft bit from the two SACCH blocks. In step 506, a partial combining algorithm may enhance soft bits or the current SACCH block by combining, for example, corresponding soft bits of the current SACCH block and a previous SACCH block. The bits combined may be the L3 payload bits. Accordingly, the enhanced soft bits may be communicated, after being generated in step 504 or 506, to either the step 430 in FIG. 4A or step 480 in FIG. 4B.

Figure 6:
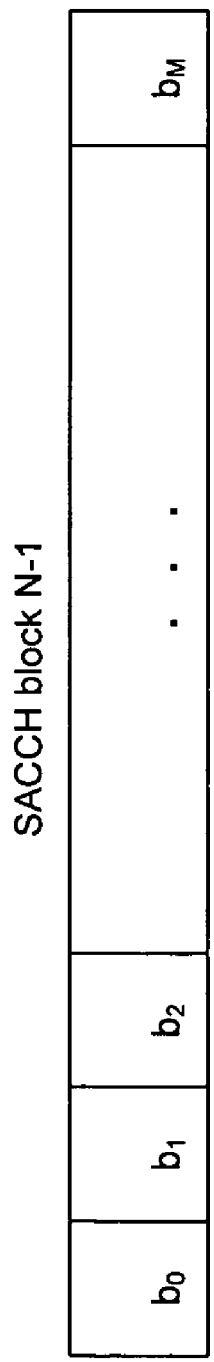
FIG. 6 is an exemplary diagram illustrating combining bits within SACCH blocks, in accordance with an embodiment of the invention.
Figure 6:
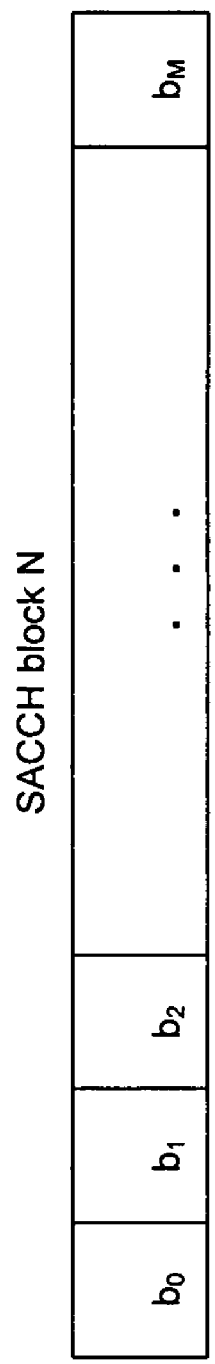

FIG. 6 is an exemplary diagram illustrating combining bits within SACCH blocks, in accordance with an embodiment of the invention. Referring to FIG. 6, there is shown two SACCH blocks 600 and 610. The SACCH block 610 may be a current SACCH block and the SACCH block 600 may be an immediately previous SACCH block. Each SACCH block may comprise bits from b0 to bM. For simplicity in description, the M bits of a SACCH block may be either the number of bits for the L3 region payload if used for partial combining in step 506, or the number of bits for the L1 region header and parity bits, and L3 region payload bits.

Accordingly, when the bits are combined, the bit b0 of the current SACCH block 610 may be combined with the bit b0 of the previous SACCH block 600. Similarly, bits b1, b2, . . . , bM of the current SACCH block 610 may be combined with the corresponding bits of the previous SACCH block 600. An implementation of the invention may achieve the combining by adding the gains of the two bits. Another implementation of the invention may achieve the combining by averaging the gains of the two bits.

The L1 parameters, for example, timing and power parameters may not change significantly between successive iterations. For example, the L1 parameters between successive iterations may vary by a small threshold, for example, 20%. The L3 bits of the previous SACCH block and the current SACCH block may be required to be similar or within a small threshold. The similarity may be checked by calculating the Hamming distance between the two L3 sequences. If the Hamming distance is greater than a threshold, then the L3 bits of the previous SACCH block and the current SACCH block may not be similar.

Figure 7A:
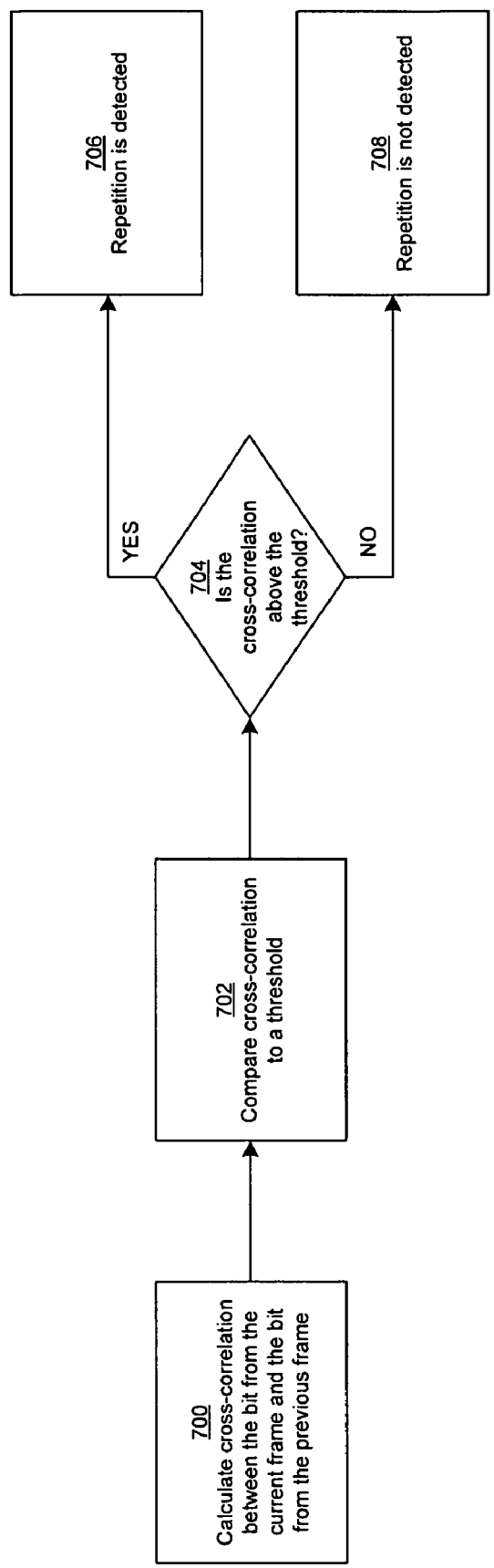
FIG. 7A is a flow diagram illustrating exemplary steps for determining repetition of control information, in accordance with an embodiment of the invention.

FIG. 7A is a flow diagram illustrating exemplary steps for determining repetition of control information, in accordance with an embodiment of the invention. Referring to FIG. 7A, in step 700, the cross-correlation between the soft bits in a current SACCH block and the soft bits in a previous SACCH block may be calculated. In step 702, the calculated cross-correlation may be compared with a threshold. In step 704, it may be determined whether the calculated cross-correlation is above a certain threshold. If the calculated cross-correlation is above a certain threshold, control passes to step 706. In step 706, repetition may be detected between the previous SACCH block and the current SACCH block. If the calculated cross-correlation is not above a certain threshold, control passes to step 708. In step 708, repetition may not be detected between the previous SACCH block and the current SACCH block.

Figure 7B:
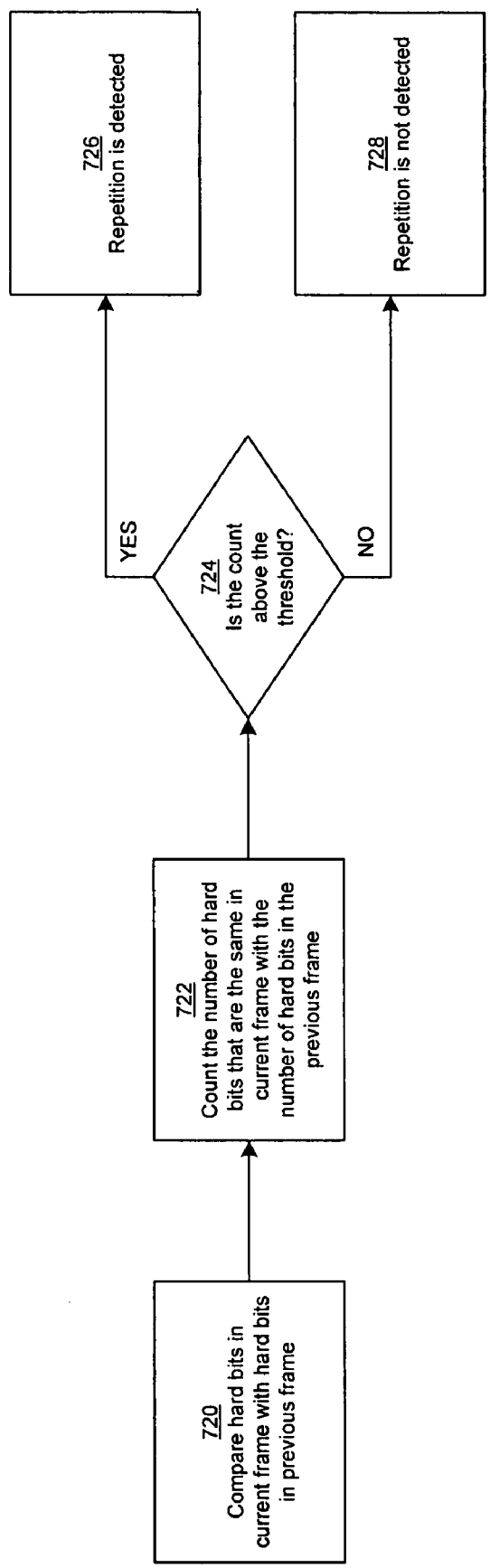
FIG. 7B is a flow diagram illustrating exemplary steps for determining repetition of control information, in accordance with an embodiment of the invention.

FIG. 7B is a flow diagram illustrating exemplary steps for determining repetition of control information, in accordance with an embodiment of the invention. Referring to FIG. 7B, in step 720, the hard bits in a current SACCH block and the hard bits in a previous SACCH block may be calculated. In step 722, the number of hard bits common to the previous SACCH block and the current SACCH block may be calculated. In step 724, it may be determined whether the calculated number of hard bits that are common to the previous SACCH block and the current SACCH block is above a certain threshold. If the calculated number of hard bits that are common to the previous SACCH block and the current SACCH block is above a certain threshold, control passes to step 726. In step 726, repetition may be detected between the previous SACCH block and the current SACCH block. If the calculated number of hard bits common to the previous SACCH block and the current SACCH block is not above a certain threshold, control passes to step 728. In step 728, repetition may not be detected between the previous SACCH block and the current SACCH block.

Figure 7C:
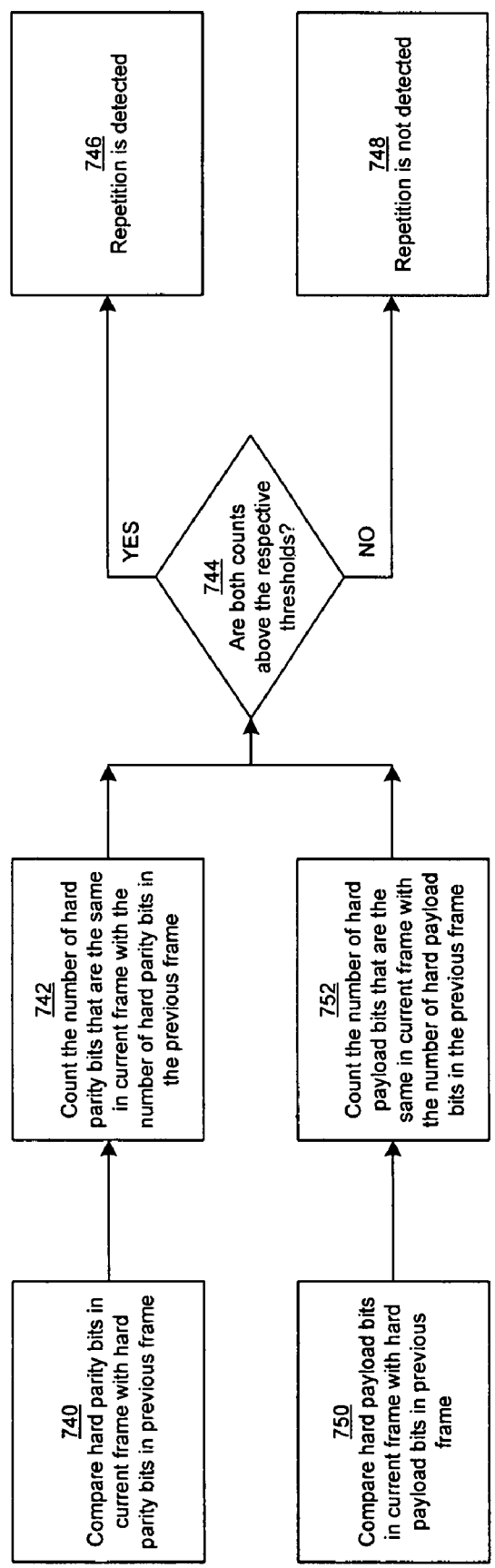
FIG. 7C is a flow diagram illustrating exemplary steps for determining repetition of control information, in accordance with an embodiment of the invention.

FIG. 7C is a flow diagram illustrating exemplary steps for determining repetition of control information, in accordance with an embodiment of the invention. Referring to FIG. 7C, in step 740, the hard header and parity bits in a current SACCH block and the hard header and parity bits in a previous SACCH block may be compared. In step 742, the number of hard header and parity bits that are common to the previous SACCH block and the current SACCH block may be calculated. The number of hard header and parity bits that are common to the previous SACCH block and the current SACCH block may be sensitive to a change in the L1 region header. In step 750, the hard payload bits in a current SACCH block and the hard payload bits in a previous SACCH block may be calculated. In step 752, the number of hard payload bits that are common to the previous SACCH block and the current SACCH block may be calculated.

In step 744, it may be determined whether the calculated number of hard header and payload bits that are common to the previous SACCH block and the current SACCH block and the calculated number of parity payload bits common to the previous SACCH block and the current SACCH block are above the respective thresholds. If the calculated number of hard header and payload bits that are common to the previous SACCH block and the current SACCH block and the calculated number of hard parity bits that are common to the previous SACCH block and the current SACCH block are each above the respective thresholds, control passes to step 746. In step 746, repetition may be detected between the previous SACCH block and the current SACCH block. If the calculated number of hard header and payload bits that are common to the previous SACCH block and the current SACCH block and/or the calculated number of hard parity bits that are common to the previous SACCH block and the current SACCH block are not above the respective thresholds, control passes to step 748. If repetition is detected, the L1 region header and parity bits and the L3 region payload bits may be utilized for full combining of the previous SACCH block and the current SACCH block. In step 748, repetition may not be detected between the previous SACCH block and the current SACCH block.

Another embodiment of the invention may provide a machine-readable storage having stored thereon, a computer program having at least one code section for processing of information, the at least one code section being executable by a machine for causing the machine to perform steps as disclosed herein.

Although various circuitry may have been described for various functionalities with respect to figures described, for example, the invention need not be so limited. For example, the processor 312 may perform at least some of the functionalities described herein.

In accordance with an embodiment of the invention, aspects of an exemplary system may comprise at least one processor, for example, the processor 312, that enables generation of enhanced soft bits for a GSM slow associated control channel (SACCH) block by combining soft bits generated for one GSM SACCH block with corresponding soft bits generated for another GSM SACCH block. One of the two GSM SACCH blocks may be subsequent to the other GSM SACCH block. The processor 312 may combine the soft bits by averaging the soft bit for the GSM SACCH block with a corresponding soft bit from the other GSM SACCH block.

The processor 312 may enable detection of whether information in one GSM SACCH block is repeated in the other GSM SACCH block. If repetition is detected, the processor 312 may generate enhanced soft bits that may comprise enhanced soft bits for at least a portion of a level 1 region and at least a portion of a level 3 region of the GSM SACCH block. If the processor 312 does not detect the repetition, the generated enhanced soft bits may comprise enhanced soft bits for at least a portion of the level 3 region of the GSM SACCH block. The processor 312 may determine detection by calculating a cross-correlation between the generated soft bits for the GSM SACCH block and the generated soft bits for the other GSM SACCH block. The detecting may also be performed by comparing hard bits of one GSM SACCH block to hard bits of another GSM SACCH block. The processor 312 may generate hard bits from the soft bits that may have been generated for the GSM SACCH block. The processor 312 may detect repetition of information if a number of the hard bits for one GSM SACCH block having the same logic value as the corresponding hard bits for the other GSM SACCH block is above a threshold value.

In accordance with another embodiment of the invention, the processor 312 may enable detection of repetition by comparing the hard bits for one GSM SACCH block to the hard bits for the other GSM SACCH block in a plurality of regions of the GSM SACCH block. The thresholds for each of the plurality of regions may be different. The plurality of regions may comprise the level 1 region and the level 3 region of the GSM SACCH block.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block; and
detecting repetition of information in said GSM SACCH block and in said another GSM SACCH block; wherein, if said repetition is detected, said generated enhanced soft bits comprise generated enhanced soft bits for at least a portion of level 1 region of said GSM SACCH block and generated enhanced soft bits for at least a portion of level 3 region of said GSM SACCH block.

2. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block; and
detecting repetition of information in said GSM SACCH block and in said another GSM SACCH block, wherein, if said repetition is undetected, said generated enhanced soft bits comprise generated enhanced soft bits for at least a portion of level 3 region of said GSM SACCH block.

3. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block;

detecting repetition of information in said GSM SACCH block and in said another GSM SACCH block, wherein said detecting is performed by comparing hard bits generated from said soft bits generated for said GSM SACCH block to hard bits generated from said soft bits generated for said another GSM SACCH block, wherein repetition is detected if a number of said generated hard bits for said GSM SACCH block that have similar logic values as corresponding said generated hard bits for said another GSM SACCH block is above a threshold.

4. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block; and
detecting repetition of information in said GSM SACCH block and in said another GSM SACCH block, wherein:
said detecting is performed by comparing hard bits generated from said soft bits generated for said GSM SACCH block to hard bits generated from said soft bits generated for said another GSM SACCH block in a plurality of regions of said GSM SACCH block and said another GSM SACCH block; and
repetition is detected if a number of said generated hard bits for said GSM SACCH block that have similar logic values as corresponding said generated hard bits for said another GSM SACCH block is above a threshold, wherein thresholds for each of said plurality of regions are different.

5. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block; and
detecting repetition of information in said GSM SACCH block and in said another GSM SACCH block, wherein:
said detecting is performed by comparing hard bits generated from said soft bits generated for said GSM SACCH block to hard bits generated from said soft bits generated for said another GSM SACCH block in a plurality of regions wherein one of said plurality of regions is a level 1 region of said GSM SACCH block and a level 1 region of said another GSM SACCH block;
repetition is detected if a number of said generated hard bits for said GSM SACCH block that have similar logic values as corresponding said generated hard bits for said another GSM SACCH block is above a threshold; and
thresholds for each of said plurality of regions are different.

6. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block; and
detecting repetition of information in said GSM SACCH block and in said another GSM SACCH block, wherein:
said detecting is performed by comparing hard bits generated from said soft bits generated for said GSM SACCH block to hard bits generated from said soft bits generated for said another GSM SACCH block in a plurality of regions comprising a level 3 region of said GSM SACCH block and a level 3 region of said another GSM SACCH block; and
repetition is detected if a number of said generated hard bits for said GSM SACCH block that have similar logic values as corresponding said generated hard bits for said another GSM SACCH block is above a threshold, wherein thresholds for each of said plurality of regions are different.

7. A method for signal processing, the method comprising:
generating enhanced soft bits for a GSM slow associated control channel (SACCH) block by combining at least a portion of soft bits generated for said GSM SACCH block with corresponding soft bits generated for another GSM SACCH block, wherein said combining comprises averaging said generated soft bit for said GSM SACCH block to a corresponding said generated soft bit for said another GSM SACCH block.

8. A system for signal processing, the system comprising:
at least one processor that enables generation of enhanced soft bits for a GSM slow associated control channel (SACCH) block by combining at least a portion of soft bits generated for said GSM SACCH block with corresponding soft bits generated for another GSM SACCH block; and
said at least one processor enables detection of repetition of information in said GSM SACCH block and in said another GSM SACCH block, wherein said generated enhanced soft bits comprise generated enhanced soft bits for at least a portion of level 1 region of said GSM SACCH block and generated enhanced soft bits for at least a portion of level 3 region of said GSM SACCH block, if said repetition is detected.

9. A system for signal processing, the system comprising:
at least one processor that enables generation of enhanced soft bits for a GSM slow associated control channel (SACCH) block by combining at least a portion of soft bits generated for said GSM SACCH block with corresponding soft bits generated for another GSM SACCH block, wherein:
said at least one processor enables detection of repetition of information in said GSM SACCH block and in said another GSM SACCH block; and
said generated enhanced soft bits comprise generated enhanced soft bits for at least a portion of level 3 region of said GSM SACCH block, if said repetition is not detected.

10. A system for signal processing, the system comprising:
at least one processor that enables generation of enhanced soft bits for a GSM slow associated control channel (SACCH) block by combining at least a portion of soft bits generated for said GSM SACCH block with corresponding soft bits generated for another GSM SACCH block;
said at least one processor enables detection of repetition of information in said GSM SACCH block and in said another GSM SACCH block; and
said at least one processor enables said detecting by comparing hard bits generated from said soft bits generated for said GSM SACCH block to hard bits generated from said soft bits generated for said another GSM SACCH block, wherein repetition is detected if a number of said generated hard bits for said GSM SACCH block that have similar logic values as corresponding said generated hard bits for said another GSM SACCH block is above a threshold.

11. A system for signal processing, the system comprising:
at least one processor that enables generation of enhanced soft bits for a GSM slow associated control channel (SACCH) block by combining at least a portion of soft bits generated for said GSM SACCH block with corresponding soft bits generated for another GSM SACCH block;

said at least one processor enables detection of repetition of information in said GSM SACCH block and in said another GSM SACCH block; and said at least one processor enables said detecting by comparing hard bits generated from said soft bits generated for said GSM SACCH block to hard bits generated from said soft bits generated for said another GSM SACCH block in a plurality of regions of said GSM SACCH block and said another GSM SACCH block, wherein:
repetition is detected if a number of said generated hard bits for said GSM SACCH block that have similar logic values as corresponding said generated hard bits for said another GSM SACCH block is above a threshold; and
thresholds for each of said plurality of regions are different.

12. A system for signal processing, the system comprising:

at least one processor that enables generation of enhanced soft bits for a GSM slow associated control channel (SACCH) block by combining at least a portion of soft bits generated for said GSM SACCH block with corresponding soft bits generated for another GSM SACCH block;

said at least one processor enables detection of repetition of information in said GSM SACCH block and in said another GSM SACCH block; and said at least one processor enables said detecting by comparing hard bits generated from said soft bits generated for said GSM SACCH block to hard bits generated from said soft bits generated for said another GSM SACCH block in a plurality of regions of said GSM SACCH block and said another GSM SACCH block, wherein:
one of said plurality of regions is a level 1 region of said GSM SACCH block and a level 1 region of said another GSM SACCH block;
repetition is detected if a number of said generated hard bits for said GSM SACCH block that have similar logic values as corresponding said generated hard bits for said another GSM SACCH block is above a threshold; and
thresholds for each of said plurality of regions are different.

13. A system for signal processing, the system comprising:

at least one processor that enables generation of enhanced soft bits for a GSM slow associated control channel (SACCH) block by combining at least a portion of soft bits generated for said GSM SACCH block with corresponding soft bits generated for another GSM SACCH block;

said at least one processor enables detection of repetition of information in said GSM SACCH block and in said another GSM SACCH block; and said at least one processor enables said detecting by comparing hard bits generated from said soft bits generated for said GSM SACCH block to hard bits generated from said soft bits generated for said another GSM SACCH block in a plurality of regions of said GSM SACCH block and said another GSM SACCH block, wherein:
one of said plurality of regions is a level 3 region of said GSM SACCH block and a level 3 region of said another GSM SACCH block;
repetition is detected if a number of said generated hard bits for said GSM SACCH block that have similar logic values as corresponding said generated hard bits for said another GSM SACCH block is above a threshold; and
thresholds for each of said plurality of regions are different.

14. A system for signal processing, the system comprising:

at least one processor that enables generation of enhanced soft bits for a GSM slow associated control channel (SACCH) block by combining at least a portion of soft bits generated for said GSM SACCH block with corresponding soft bits generated for another GSM SACCH block, wherein said combining comprises averaging said generated soft bit for said GSM SACCH block to a corresponding said generated soft bit for said another GSM SACCH block.

15. A method for signal processing, the method comprising:

generating enhanced soft bits for a GSM slow associated control channel (SACCH) block by combining at least a portion of soft bits generated for said GSM SACCH block with corresponding soft bits generated for another GSM SACCH block; and detecting repetition of information in said GSM SACCH block and in said another GSM SACCH block; wherein said detecting is performed by calculating a cross-correlation between said generated soft bits for said GSM SACCH block and said generated soft bits for said another GSM SACCH block.

16. A system for signal processing, the system comprising:

at least one processor that enables generation of enhanced soft bits for a GSM slow associated control channel (SACCH) block by combining at least a portion of soft bits generated for said GSM SACCH block with corresponding soft bits generated for another GSM SACCH block; and said at least one processor enables detection of repetition of information in said GSM SACCH block and in said another GSM SACCH block, wherein said at least one processor enables said detecting by calculating a cross-correlation between said generated soft bits for said GSM SACCH block and said generated soft bits for said another GSM SACCH block.

* * * * *

UNITED STATES PATENT AND TRADEMARK OFFICE
CERTIFICATE OF CORRECTION

PATENT NO. : 7,620,013 B2  Page 1 of 1
APPLICATION NO. : 11/325997
DATED : November 17, 2009
INVENTOR(S) : Zeng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Twenty-sixth Day of October, 2010

David J. Kappos
*Director of the United States Patent and Trademark Office*